Jan. 16, 1962    R. E. BOSSERT    3,017,149
FISHING ROD REST
Filed June 20, 1960
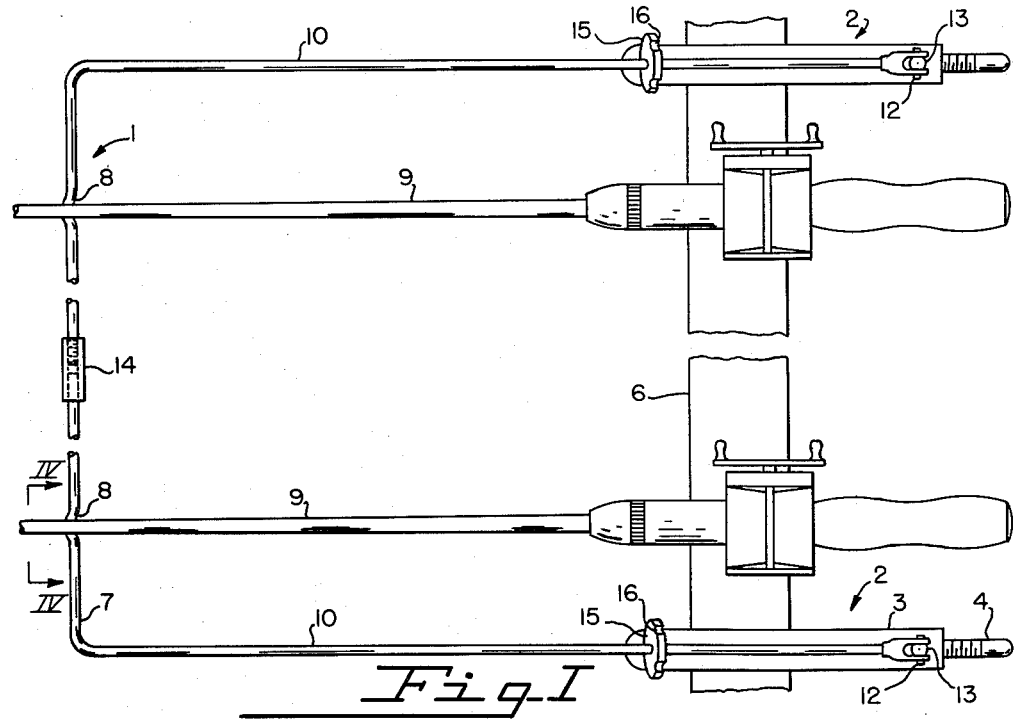
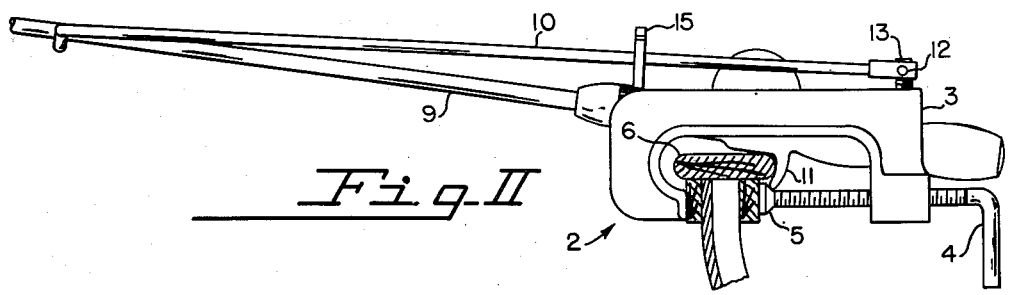
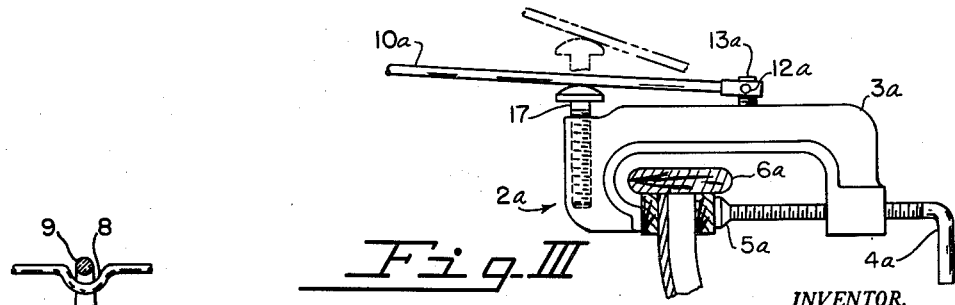
INVENTOR.
RICHARD E. BOSSERT
BY
Marshall + Wilson
ATTORNEYS

United States Patent Office 3,017,149
Patented Jan. 16, 1962

3,017,149
FISHING ROD REST
Richard E. Bossert, 2702 Randall Drive, Oregon, Ohio
Filed June 20, 1960, Ser. No. 37,312
2 Claims. (Cl. 248—39)

This invention relates to fishing rod rests.

The principal object of this invention is to provide a fishing rod rest which is detachably mountable on a support, such as the side of a boat, and which will so support a fishing rod that, when a fish bites, the fishing rod can be disengaged from the fishing rod rest without frightening the fish.

Another object of the invention is to provide a fishing rod rest which will so support two fishing rods each within easy reach of a fisherman that, when fish bite, the fishing rods can be disengaged readily from the fishing rod rest.

A further object is to provide a fishing rod rest of simple, rugged construction which is formed in several pieces for ease in transporting and which is easy to assembly and disassemble.

Another object is to provide a fishing rod rest which is detachably mountable on a support, such as the side of a boat, and which is arranged to support one end of a fishing rod while the other end of the fishing rod is supported by the support and from which the fishing rod can be disengaged quickly by merely picking it up.

Still another object is to provide a fishing rod rest having improved adjustment means for raising and lowering an end of a fishing rod resting thereon.

Other objects and advantages of the invention will become apparent upon perusal of the following description as illustrated by the accompanying drawings in which:

FIG. I is a plan view of the fishing rod rest attached to the side of a boat showing two fishing rods supported partly by the fishing rod rest and partly by the side of the boat;

FIG. II is an elevational view of the fishing rod rest illustrated in FIG. I;

FIG. III is an elevational view showing a modification of the fishing rod rest; and FIG. IV is a fragmentary elevational view as seen from a position along the line IV—IV of FIG. I.

The following description and the accompanying drawings are to be taken as illustrative of the invention but are not to impose limitations on its scope.

The fishing rod rest includes a flat-bottomed U-shaped frame 1 pivotally mounted on a pair of clamps 2. Each of the clamps 2 comprises a C-shaped member 3 through one leg of which a screw bolt 4 extends. A head piece 5 is pivotally mounted on one end of the bolt 4 and, in conjunction with the other leg of the C-shaped member, functions to detachably clamp the clamp 2 on the side of a boat 6.

The flat-bottomed U-shaped frame 1 includes a side 7 forming the bottom of the U-shape with two upwardly opening indentations 8 therein each adapted to receive a fishing rod 9 and support it from below the two end members or legs 10 each forming a leg of the U-shape extending from the frame side. The fishing rods 9 are supported partly by the frame side 7 and partly by the side of the boat 6, a finger rest 11 (FIG. II) on each of the fishing rods 9 engaging the side of the boat 6 in opposition to pulling on the rods by fish. When a fish bites, either one of the fishing rods 9, which are held in easy reach of a fisherman, sitting therebetween, can be disengaged from the fishing rod rest quickly by merely picking it up without frightening the fish.

The frame legs 10 each is pivotally mounted on its respective clamp 2 by means of a pin 12 which extends through a bifurcated end of the leg 10 and through the top of a stud 13 atop such clamp 2 in a position remote from the frame side 7, the top of such stud 13 being received by such bifurcated leg end. This pivotally connects the frame 1 to the side of the boat 6 and supports the frame over water adjacent the side of the boat. The flat-bottomed U-shaped frame together with the clamps is a simple, rugged structure. For ease in transporting the fishing rod rest, the frame consists of two pieces which are detachably connected by means of a sleeve 14 that is secured to one of the pieces of the frame side 7 and which receives the other one of the pieces of the frame side 7 and holds it in a friction grip. The fishing rod rest is easy to assemble and disassemble by pushing the free end of one of the frame sides 7 into the sleeve and by pulling such free end out of the sleeve, respectively.

One of the features of the fishing rod rest resides in its adjustability; the frame side 7 is readily raised or lowered to, for example, make the fishing rods level with the water. A slidable adjustment washer 15, having several notches 16 about its periphery, is mounted on each of the frame legs 10 intermediate the leg ends, i.e., between the frame side 7 and the respective pivot pin 12, the washer 15 resting on the respective C-shaped member 3. Sliding the washers toward the respective pivot pins raises the frame side 7 and sliding the washers away from such pivot pins lowers the frame side by pivoting the legs 10 about the axes of the pivot pins 12, the notches 16 in the washers preventing turning of the washers 15 and the weight of the apparatus and friction preventing longitudinal movement of the washers 15 when in operative positions.

A modification of the adjustment means is illustrated in FIG. III. Reference numbers in FIG. III which are similar to those in FIGS. I, II and IV refer to parts which are similar in structure and in function. An adjustment screw 17 is threaded into each of the C-shaped members 3a between the frame side and the respective pivot pin 12a, the frame legs 10a each resting on the head of the adjustment screw 17 provided therefor. Raising and lowering the heads of the adjustment screws 17 relative to the respective clamps 2a raises and lowers, respectively, the frame side by pivoting the legs 10a about the axes of the pivot pins 12a. The fishing rod rest is shown in a lower position in solid lines in an upper position in broken lines in FIG. III.

Various modifications in details of construction may be made without departing from the spirit and scope of the invention.

Having described the invention, I claim:

1. A fishing rod rest comprising a frame having an end with upwardly opening indentations therein each adapted to receive a fishing rod and support it from below and side members extending from the frame end, clamp means for each of the side members for connecting the frame to the side of a boat and supporting the frame over water adjacent the side of the boat, pivot means for pivotally connecting the side members to the clamp means at locations remote from the frame end, and adjustment means on the clamp means for pivoting the side members about the axes of the pivot means, at least one of the adjustment means comprising a slidable washer on one of the side members between the respective pivot means and the frame end, the washer resting on the respective clamp means whereby sliding the washer toward the respective pivot means raises the frame end and sliding the washer away from such pivot means lowers the frame end.

2. A fishing rod rest according to claim 1 wherein the frame consists of two pieces and means are provided for detachably connecting the two pieces.

References Cited in the file of this patent

UNITED STATES PATENTS

| | | |
|---|---|---|
| 2,089,452 | Utley | Aug. 10, 1937 |
| 2,852,218 | Stires | Sept. 16, 1958 |

FOREIGN PATENTS

| | | |
|---|---|---|
| 969,794 | France | May 31, 1950 |